E. A. LOCKE.
METALLIC SEALS.

No. 187,396. Patented Feb. 13, 1877.

WITNESSES:
Jas. E. Hutchinson.
Henry C. Hazard.

INVENTOR:
E. A. Locke, by
Prindle & Co, his Attys

UNITED STATES PATENT OFFICE.

EDWARD A. LOCKE, OF BOSTON, MASSACHUSETTS.

IMPROVEMENT IN METALLIC SEALS.

Specification forming part of Letters Patent No. 187,396, dated February 13, 1877; application filed February 1, 1877.

*To all whom it may concern:*

Be it known that I, EDWARD A. LOCKE, of Boston, in the county of Suffolk, and in the State of Massachusetts, have invented certain new and useful Improvements in Metallic Seals; and do hereby declare that the following is a full, clear, and exact description thereof, reference being had to the accompanying drawing, making a part of this specification, in which—

Figure 1:
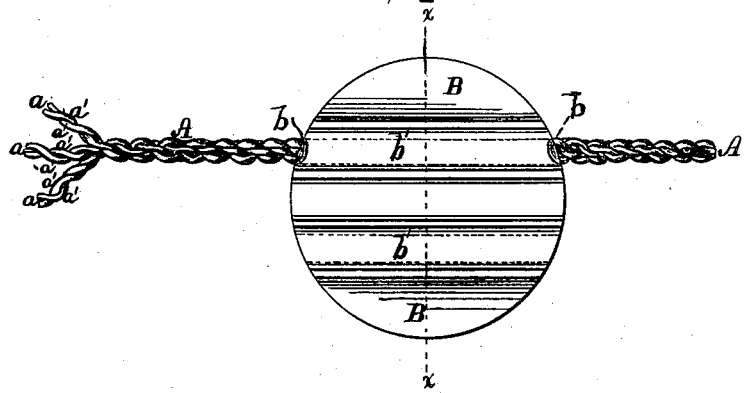
Figure 2:
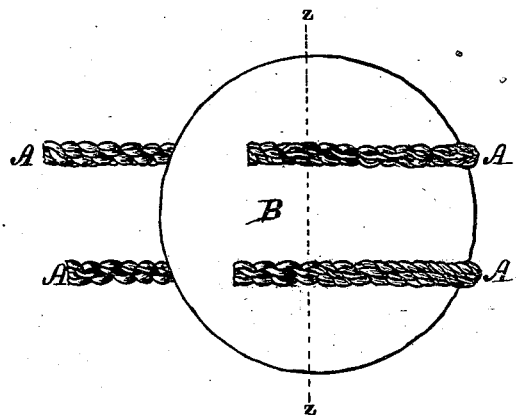
Figure 3:
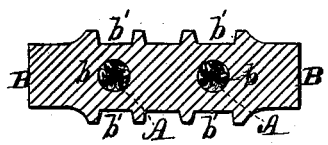
Figure 4:
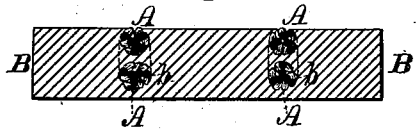

Figure 1 is a plan view of my seal as arranged for storage and transportation. Fig. 2 is a like view of the same with the seal compressed upon the ends of the shackle. Fig. 3 is a cross-section upon line $x\,x$ of Fig. 1, and Fig. 4 is a like view upon line $z\,z$ of Fig. 3.

Letters of like name and kind refer to like parts in each of the figures.

In the sealing of cars for the purpose of preventing unauthorized persons from tampering with their contents, the simplest form of seal used has been a soft-metal disk, which could be passed over the ends of a doubled sealing-shackle, and then, by compression, be caused to adhere to said ends with sufficient force to prevent disengagement therefrom without the mutilation of said parts; but much difficulty has heretofore been experienced in securing the necessary adhesion of said disks, and many improvements have been made with a view to overcome such difficulty.

To remedy this difficulty is the design of my invention; which consists, principally, in combining with a soft-metal seal a sealing-shackle composed of two or more strands twisted together, each of which strands is formed by twisting together two or more wires, substantially as and for the purpose hereinafter specified.

It consists, further, in a sealing device in which the seal is primarily secured upon one end of a shackle by compressing, mechanically, a portion of the metal surrounding the opening through which said shackle end passes, substantially as and for the purpose hereinafter shown.

It consists, finally, in a sealing-disk provided upon each of its sides with a groove or grooves to receive the rearward-turned ends of the shackle, substantially as and for the purpose hereinafter set forth.

I am aware that sealing devices have before been used in which the projecting ends of the shackle have been turned in opposite directions into a groove formed within the periphery or edge of the sealing-disk, and do not, therefore, claim such device.

In the annexed drawing, A represents my sealing-shackle, which is composed of two or more strands, $a$, that are twisted together, and each of said strands is formed by the twisting together of two or more wires, the result being that the surface of said shackle is covered with indentations that are largest at their outer portions, and into which a soft metal may be easily forced by compression. For use with the shackle A I employ a sealing-disk, B, which has, preferably, a round form in plan view, and is provided with two parallel round openings, $b$, that pass edgewise through said disk, and permit of the insertion of the ends of said shackle, after which, by compression, the former is closed upon the latter, and its material forced into the indentations, so as to prevent removal without mutilation of said disk.

In order that the sealing device may be in condition for use when needed, the seal B is placed in position upon one end of the shackle A, and is secured thereon by compressing the ends of the opening $b$, such attachment being sufficient only to prevent the accidental detachment of said parts.

To effect the same result, a seal has heretofore been cast upon one end of a shackle; but such a plan has proved objectionable, in consequence of the fact that the seal at the point where said shackle end was contained was solid and less compressible than at the point where an opening was left for the other end of said shackle, and that, as a consequence, said seal could not be readily compressed until it firmly clasped the latter.

To effect still greater security of attachment of the seal B one or more grooves, $b'$, are provided within each face of the same, and into said grooves are doubled backward the ends of the shackle A, after which compression is applied, and said seal is not only caused to closely embrace said shackle, but said backward turned ends are embedded within the surface of the former and cannot be detached therefrom without mutilation, while for such detachment tools are required and a considerable amount of force is necessary.

In order that the shackle ends may be embedded within the face of the seal without materially increasing the force necessary to compress the latter, the grooves $b'$ are formed by raising the metal upon the side of each above the general surface of said face.

If desired, the sealing-shackle A may be formed by braiding the strands $a$ instead of twisting the latter, the indentations being the same in form and having the same general arrangement in each case.

Having thus fully set forth the nature and merits of my invention, what I claim as new is—

1. In combination with a soft-metal seal, a sealing-shackle composed of two or more strands twisted together, each of which strands is formed by twisting together two or more wires, substantially as and for the purpose specified.

2. A sealing device in which the seal is primarily secured upon one end of a shackle by compressing mechanically a portion of the metal surrounding the opening through which said shackle end passes, substantially as and for the purpose shown.

3. A sealing-disk provided upon one or both of its sides with a groove or grooves to receive the rearward-turned ends of the shackle, substantially as and for the purpose set forth.

In testimony that I claim the foregoing I have hereunto set my hand this 31st day of January, 1877.

EDWARD A. LOCKE.

Witnesses:
GEO. S. PRINDLE,
FRANK GALT.